United States Patent
Xu et al.

(10) Patent No.: US 10,917,757 B2
(45) Date of Patent: Feb. 9, 2021

(54) VEHICLE NETWORK V2X SERVICE SENDING METHOD AND APPARATUS

(71) Applicant: ZTE CORPORATION, Guangdong (CN)

(72) Inventors: Hui Xu, Guangdong (CN); Zijiang Ma, Guangdong (CN); Chen Lu, Guangdong (CN); Yutang Xie, Guangdong (CN); Yaying Wang, Guangdong (CN)

(73) Assignee: ZTE Corporation, Guangdong (CN)

(*) Notice: Subject to any disclaimer, the term of this patent is extended or adjusted under 35 U.S.C. 154(b) by 0 days.

(21) Appl. No.: 15/772,957

(22) PCT Filed: Jul. 5, 2016

(86) PCT No.: PCT/CN2016/088633
§ 371 (c)(1),
(2) Date: May 2, 2018

(87) PCT Pub. No.: WO2017/076037
PCT Pub. Date: May 11, 2017

(65) Prior Publication Data
US 2018/0324560 A1 Nov. 8, 2018

(30) Foreign Application Priority Data
Nov. 2, 2015 (CN) .......................... 2015 1 0733829

(51) Int. Cl.
*H04W 4/06* (2009.01)
*H04W 76/11* (2018.01)
(Continued)

(52) U.S. Cl.
CPC .............. *H04W 4/06* (2013.01); *H04W 4/40* (2018.02); *H04W 28/0268* (2013.01);
(Continued)

(58) Field of Classification Search
CPC ..... H04W 4/06; H04W 72/042; H04W 28/24; H04W 4/40; H04W 76/11; H04W 28/0268

See application file for complete search history.

(56) References Cited

U.S. PATENT DOCUMENTS

2015/0257127 A1 9/2015 Huarui et al.
2018/0206089 A1* 7/2018 Cavalcanti ........ H04W 36/0083
(Continued)

FOREIGN PATENT DOCUMENTS

CN 101018168 A 8/2007
CN 101043252 A 9/2007
(Continued)

OTHER PUBLICATIONS

Cavalcanti et al., "V2X IP Services in LTE/5G", U.S. Appl. No. 62/222,579, filed Sep. 23, 2015 (Year: 2015).*
(Continued)

*Primary Examiner* — Thinh D Tran
(74) *Attorney, Agent, or Firm* — Knobbe Martens Olson & Bear LLP

(57) ABSTRACT

Provided is a method for sending a V2X service. The method includes: a Vehicle-to-Everything (V2X) Application Server (AS) classifies and identifies the V2X service, where different types of V2X service have different identifiers; the V2X AS sends a request message to a Broadcast Multicast Service Center (BM-SC), where the request message is used for instructing the BM-SC to establish a Multimedia Broadcast Multicast Service (MBMS) bearing corresponding to an identifier of the V2X service; and the V2X AS sends the V2X service through the MBMS bearing established by the BM-SC.

9 Claims, 8 Drawing Sheets

(51) Int. Cl.
  *H04W 4/40* (2018.01)
  *H04W 28/02* (2009.01)
  *H04W 28/24* (2009.01)
  *H04W 72/04* (2009.01)

(52) U.S. Cl.
  CPC ......... *H04W 28/24* (2013.01); *H04W 72/042* (2013.01); *H04W 76/11* (2018.02)

(56) References Cited

U.S. PATENT DOCUMENTS

| | | | | |
|---|---|---|---|---|
| 2018/0206137 A1* | 7/2018 | Ryu | ........................ | H04W 4/70 |
| 2018/0213376 A1* | 7/2018 | Pinheiro | ............... | H04W 76/14 |
| 2018/0213550 A1* | 7/2018 | Li | ........................ | H04W 72/02 |
| 2018/0242190 A1* | 8/2018 | Khoryaev | ............. | H04L 47/283 |
| 2018/0242385 A1* | 8/2018 | Chandramouli | ........ | H04L 67/12 |
| 2018/0367604 A1* | 12/2018 | Kodaypak | ............... | H04W 4/06 |

FOREIGN PATENT DOCUMENTS

| | | |
|---|---|---|
| CN | 103391370 A | 11/2013 |
| CN | 103716754 A | 4/2014 |
| CN | 103781198 A | 5/2014 |
| WO | 2015142082 A1 | 9/2015 |

OTHER PUBLICATIONS

International Search Report dated Sep. 23, 2016 for International Application No. PCT/CN2016/088633, 5 pages.
Written Opinion of the International Searching Authority dated Sep. 23, 2016 for International Application No. PCT/CN2016/088633, 8 pages.
Extended European Search Report of corresponding Application No. 16861307.3—9 pages (dated May 15, 2019).
Huawei, "Feasibility study for Uu transport for V2V service", 3GPP TSG-RAN WG2 Meeting #91bis, R2-154613—8 pages (Oct. 4, 2015).
"3rd Generation Partnership Project; Technical Specification Group Services and System Aspects; Group Communication System Enablers for LTE (GCSE_LTE); Stage 2 (Release 13)", 3GPP TS 23.468, V13.2.0—30 pages (Sep. 17, 2015).
European Office Action issued in application No. 16861307.3 dated Mar. 18, 2020.
European Office Action issued in application No. 16861307.3 dated Oct. 10, 2020.
Samsung, "Necessary Enhancement to Support V2X on UU Interface", 3GPP TSG RAN WG1 #82bis, Malmo, Sweden (Oct. 5-Sep. 2015).
Extended European Search Report of corresponding Application No. 16861307.3—9 pages (dated Mar. 18, 2020).
"3rd Generation Partnership Project; Technical Specification Group Services and System Aspects; Multimedia Broadcast/Multicast Service (MBMS); Protocols and codecs (Release 11)", 3GPP TS 26.346 V11.5.0—168 pages (Jun. 19, 2013).

* cited by examiner

VEHICLE NETWORK V2X SERVICE SENDING METHOD AND APPARATUS

CROSS REFERENCE TO RELATED APPLICATIONS

This application the U.S. National Phase Application under 35 U.S.C. § 371 of International Application No. PCT/CN2016/088633, filed Jul. 5, 2016, designating the U.S. and published as WO 2017/076037 A1 on May 11, 2017 which claims priority to Chinese Application No. 201510733829, filed on Nov. 2, 2015, entitled "Vehicle Network V2X Service Sending Method and Apparatus," the entire disclosure of each of which is hereby incorporated by reference.

TECHNICAL FIELD

The present application relates to, but not limited to, the field of communications, and particularly relates to a method and apparatus of sending a Vehicle to Everything (V2X) service.

BACKGROUND

Along with the rapid development of social economy, the quantity of autos in China increases rapidly and road traffic accidents occur frequently, which have become one of important factors affecting the public safety in China in recent years. The road traffic safety has become one of basic issues affecting social harmony and improvement of people's livelihood. China urgently needs to improve traffic safety in terms of technologies, policies, educations, etc. Among them, an improvement of vehicle safety design is an important part.

Technologies for improving vehicle safety are mainly divided into a passive safety technology and an active safety technology. The passive safety technology is used for protecting people and articles inside or outside a vehicle after an accident occurs. The active safety technology is used for preventing or reducing vehicle accidents and for preventing people from being harmed. The active safety technology is the key and trend in the development of modern vehicle safety technologies.

A collision warning system based on communications, by using an advanced wireless communication technology and a new generation of information processing technology, implements real-time information interaction between vehicles and between vehicles and roadside infrastructure in which they inform each other of the current status (including position, speed, acceleration and driving path of the vehicles) and the acquired road environment information, cooperatively acquire road hazard conditions, and provide pieces of collision warning information in time to prevent road traffic safety accidents, thereby becoming a new way for various countries to try to solve the problem of road traffic safety.

Vehicle-to-Everything (V2X) refers to providing vehicle information through sensors, on-board terminals and electronic tags mounted on vehicles, implementing intercommunications of Vehicle to Vehicle (V2V), Vehicle to Pedestrian (V2P) and Vehicle to Infrastructure (V2I) using various communication technologies, and effectively using information by way of extracting, sharing, etc. from an information network platform to perform effective management and control and provide comprehensive services for vehicles.

FIG. 1 is a schematic diagram of sending traffic and scheduling information to a vehicle through a network information platform in the related art.

A Roadside Unit (RSU) has a function of a gateway of receiving requests from vehicles and ensuring the access of the vehicles to the Internet, as well as functions of data operation, storage and forwarding.

There are currently two kinds of V2X technologies: Dedicated Short Range Communication (DSRC) and Long Term Evolution (LTE). The DSRC is on the basis of IEEE 802.11P and IEEE 1609 series standards. The 802.11P is responsible for a physical layer and Medium Access Control (MAC) technology, while the 1609 is responsible for specifications of upper layers. The V2X technology based on the LTE has just been put into discussion and there is no standard for the V2X technology based on the LTE.

At present, the LTE V2X technology which is being discussed by the Third Generation Partnership Project (3GPP) includes that: the RSU may be implemented by a User Equipment (UE) or an eNodeB (eNB), and the V2V/V2I/V2P may be implemented via a PC5 interface or a Uu interface. The PC5 interface is a Device-to-Device (D2D) air interface. The Uu interface is an air interface from the UE to the eNB.

In order to use resources of the mobile network more efficiently, 3GPP proposed Multimedia Broadcast Multicast Service (MBMS). This service is a technology for transmitting data from one data source to multiple target mobile terminals, thereby implementing sharing of the resources of the network (including a core network and an access network) and improving the utilization ratio of the network resources (especially air interface resources) of the. 3GPP proposed a research subject of single cell MBMS in the LTE-Advanced (LTE-A) of Release 13 (R13). The single cell MBMS service is transmitted in a Physical Downlink Shared Channel (PDSCH).

In the related art, it is difficult for a V2X Application Server (AS) to forward different types of V2X services.

SUMMARY

Embodiments of the present disclosure provide a method and apparatus for sending a V2X service, so as to address at least the problem that it is difficult for the V2X AS to forward different types of V2X services in the related art.

According to an aspect of the embodiments of the present disclosure, a method for sending a V2X service is provided. The method includes: a Vehicle-to-Everything (V2X) Application Server (AS) classifies and identifies the V2X service, where different types of V2X services have different identifiers; the V2X AS sends a request message to a Broadcast Multicast Service Center (BM-SC), where the request message is used for instructing the BM-SC to establish a Multimedia Broadcast Multicast Service (MBMS) bearing corresponding to an identifier of the V2X service; and the V2X AS sends the V2X service through the MBMS bearing established by the BM-SC.

In one or more embodiments, the BM-SC establishes the MBMS bearing for the V2X service as follows: the BM-SC establishes the MBMS bearing corresponding to a type of the V2X service acquired in advance.

In one or more embodiments, the MBMS bearing includes one of the followings: Single Cell Point-to-Multipoint (SC-PTM), Multimedia Broadcast Single Frequency Network (MBSFN).

In one or more embodiments, the step in which the V2X AS classifies and identifies the V2X service includes:

the V2X AS classifies the V2X service according to a type or a priority of the V2X service; the V2X AS identifies the classified V2X service, where the identifier of the classified V2X service is a Temporary Mobile Group Identity (TMGI) allocated by the BM-SC.

In one or more embodiments, the request message carries at least one of the followings: Quality of Service (QoS) of the V2X service, a broadcast area of a target area of the V2X service, a starting time for sending the V2X service.

In one or more embodiments, the step in which the V2X AS sends the V2X service through the MBMS bearing established by the BM-SC includes: the V2X AS sends announcement information of the V2X service to an On-Board Unit (OBU), where the announcement information includes at least one of the followings: a service identifier of the V2X service, a starting time for sending the V2X service, a target area to which the V2X service is sent, a carrier frequency on which the V2X service is sent; the V2X AS sends the V2X service through the MBMS bearing to the target area of the V2X service determined by the V2X AS.

According to another aspect of the embodiments of the present disclosure, a method for sending a V2X service is provided. The method includes: a Broadcast Multicast Service Center (BM-SC) receives from a Vehicle-to-Everything (V2X) Application Server (AS) a request message for activating a Multimedia Broadcast Multicast Service (MBMS) bearing, where the request message carries an identifier of the V2X service classified by the V2X AS; the BM-SC establishes the MBMS bearing corresponding to the identifier of the V2X service in response to the request message.

In one or more embodiments, the method further includes: the BM-SC receives information of a target area of the V2X service determined by the V2X AS; the BM-SC distinguishes MBMS bearings according to the target areas of the V2X service.

In one or more embodiments, the BM-SC establishes the MBMS bearing corresponding to the identifier of the V2X service by the following way: the BM-SC pre-establishing the MBMS bearing corresponding to a type of the V2X service.

According to yet another aspect of the embodiments of the present disclosure, an apparatus for sending a V2X service is provided, which is applied to a Vehicle-to-Everything (V2X) Application Server (AS). The apparatus includes: a processing module configured to classify and identify a V2X service, where different types of V2X service have different identifiers; an acquisition module configured to send a request message to a Broadcast Multicast Service Center (BM-SC), where the request message is used for instructing the BM-SC to establish a Multimedia Broadcast Multicast Service (MBMS) bearing corresponding to an identifier of the V2X service; and a sending module configured to send the V2X service through the MBMS bearing established by the BM-SC.

In one or more embodiments, the BM-SC establishes the MBMS bearing for the V2X service as follows: the BM-SC establishes the MBMS bearing corresponding to a type of the V2X service acquired in advance.

In one or more embodiments, the MBMS bearing includes one of the followings: Single Cell Point-to-Multipoint (SC-PTM), Multimedia broadcast Single Frequency Network (MBSFN).

In one or more embodiments, the processing module includes: a processing unit configured to classify the V2X service according to a type or a priority of the V2X service; an identifying module configured to identify the classified V2X service, where the identifier of the classified V2X service is a Temporary Mobile Group Identity (TMGI) allocated by the BM-SC.

In one or more embodiments, the request message carries at least one of the followings: Quality of Service (QoS) of the V2X service, a broadcast area of a target area of the V2X service, a starting time for sending the V2X service.

In one or more embodiments, the sending module includes: a second sending unit configured to send announcement information of the V2X service to an On-Board Unit (OBU), where the announcement information includes at least one of the followings: a service identifier of the V2X service, a starting time for sending the V2X service, a target area to which the V2X service is sent, a carrier frequency on which the V2X service is sent; a third sending unit configured to send the V2X service through the MBMS bearing to the target area of the V2X service determined by the V2X AS.

According to yet another aspect of the embodiments of the present disclosure, an apparatus for sending a V2X service is provided. The apparatus includes: a receiving module configured to receive from a Vehicle-to-Everything (V2X) Application Server (AS) a request message for activating a Multimedia Broadcast Multicast Service (MBMS) bearing, where the request message carries an identifier of the V2X service classified by the V2X AS; an establishment module configured to, in response to the request message, establish the MBMS bearing corresponding to the identifier of the V2X service.

In one or more embodiments, the apparatus further includes: a receiving module configured to receive information of a target area of the V2X service determined by the V2X AS; a distinguishing module configured to distinguish the MBMS bearing according to the target area of the V2X service.

In one or more embodiments, the establishment module is configured to establish the MBMS bearing corresponding to the identifier of the V2X service by the following way: pre-establishing the MBMS bearing corresponding to a type of the V2X service.

According to yet another aspect of the embodiments of the present disclosure, a system of sending V2X service is provided. The system includes the apparatus of sending V2X service applied to the V2X AS and the apparatus of sending V2X service applied to the BM-SC.

Embodiments of the present disclosure further provides a computer readable storage medium on which computer executable instructions are stored. The computer executable instructions, when executed, implement the method for sending a V2X service applied to the V2X AS described above.

Embodiments of the present disclosure further provides a computer readable storage medium on which computer executable instructions are stored. The computer executable instructions, when executed, implement the method for sending a V2X service applied to the BM-SC described above.

In the embodiments of the present disclosure, the V2X AS classifies a V2X service, where different types of V2X services have different identifiers; then the V2X AS sends a request message to the BM-SC, where the request message is used for instructing the BM-SC to establish a MBMS bearing corresponding to the identifier of the V2X service; and the V2X AS sends the V2X service through the MBMS bearing. In other words, in the embodiments, the V2X AS classifies V2X services and establishes, for the classified V2X services, the MBMS bearings corresponding to the classified V2X services. In this way, the V2X AS can forward each of the classified V2X services through the corresponding MBMS bearer. This solves the problem that it is difficult for the V2X AS to forward different types of V2X services in the related art, and thus fills the blank in the related art.

Other aspects can be understood after reading and understanding the drawings and detailed description below.

DETAILED DESCRIPTION

The present application will be described below in combination with the embodiments with reference to the accompanying drawings.

It is noted that the terms "first", "second" and the like in description, claims and above drawings of the present application are used to distinguish similar objects, and not necessarily to describe in a certain order or sequence.

Figure 1:
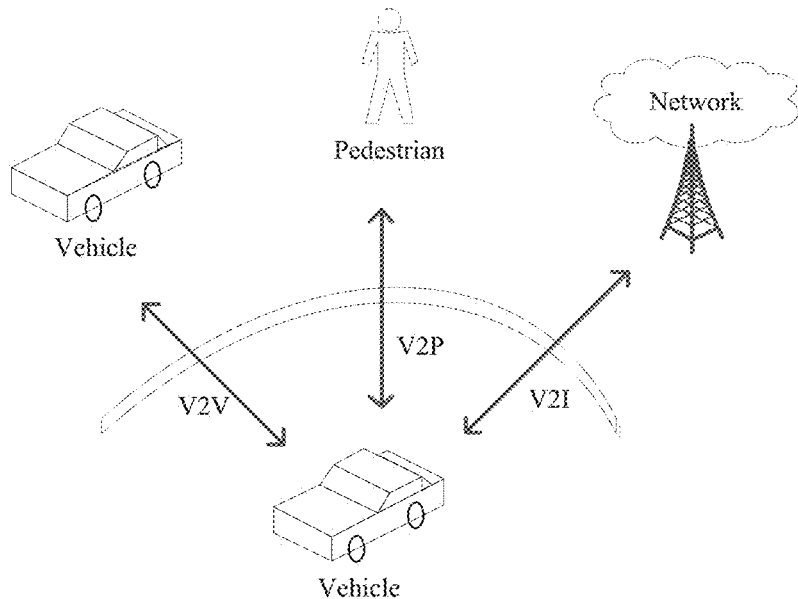
FIG. 1 is a schematic diagram of sending of traffic and scheduling information to a vehicle through a network information platform in the related art.
Figure 2:
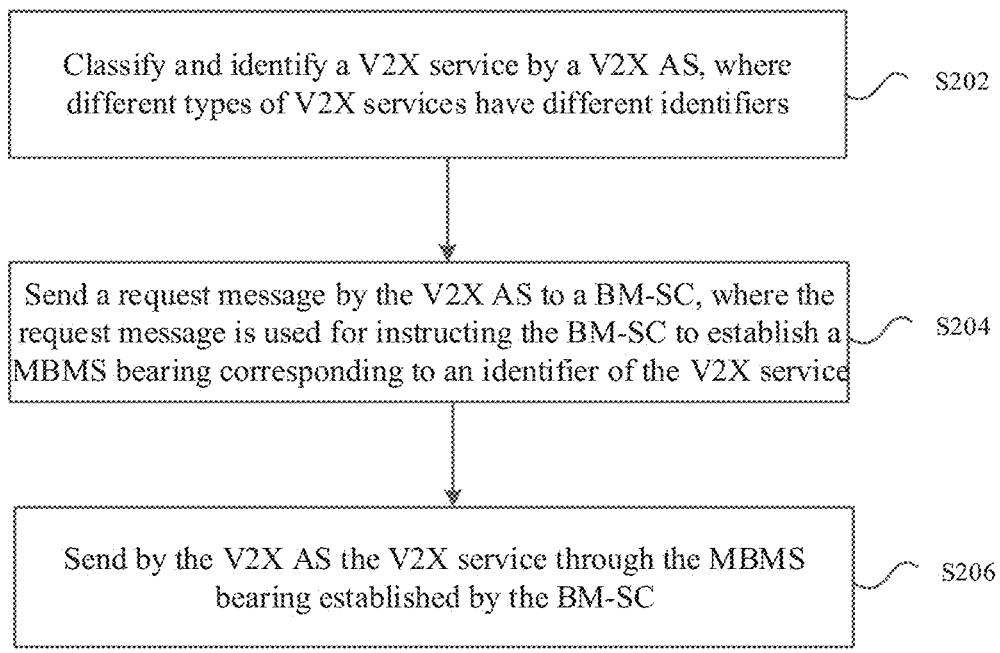
FIG. 2 is a flow chart of a method for sending a V2X service applied to a V2X AS according to an embodiment of the present disclosure.

An embodiment provides a method for sending a V2X service. FIG. 2 is a flow chart of a method for sending a V2X service applied to a V2X AS according to an embodiment of the present disclosure. As shown in FIG. 2, the method includes the steps described below.

In step S202, the V2X AS classifies and identifies the V2X service, where different types of V2X services have different identifiers.

In step S204, the V2X AS sends a request message to a BM-SC, where the request message is used for instructing the BM-SC to establish a MBMS bearing corresponding to an identifier of the V2X service.

In step S206, the V2X AS sends the V2X service through the MBMS bearing established by the BM-SC.

It can be seen from the steps S202 to S206 of the embodiment, the V2X AS classifies and identifies the V2X service, where the different types of the V2X services have different identifiers; then the V2X AS sends a request message to the BM-SC, where the request message is used for instructing the BM-SC to establish the MBMS bearing corresponding to the identifier of the V2X service; and the V2X AS sends the V2X service through the MBMS bearing. In other words, in the embodiment, the V2X AS classifies the V2X service and establishes, for the classified V2X service, the MBMS bearing corresponding to the classified V2X service. In this way, the V2X AS can forward the classified V2X service through the MBMS bearing. This solves the problem that it is difficult for the V2X AS to forward different types of V2X services in the related art, and thus fills the blank in the related art.

It is noted that the request message carries at least one of the followings: QoS of the V2X service, a broadcast area for indicating a target area of the V2X service, a starting time for sending the V2X service. The V2X AS sends to the BM-SC the request message for activating the MBMS bearing. The request message includes at least one of the followings: TMGI, QoS, the broadcast area, and the starting time. The TMGI is used for indicating the V2X service. If the request message does not carry the TMGI, the BM-SC indicates a TMGI in the response message. The QoS is used for indicating the requirement on QoS for the V2X service. The broadcast area is used for indicating the target area of the V2X service, which may be represented by a Cell identifier (ID). The starting time is used for indicating a starting time for sending the V2X service.

In one or more embodiments, the BM-SC establishes the MBMS bearing for the V2X service as follows: the BM-SC establishes the MBMS bearing corresponding to a type of the V2X service acquired in advance. The MBMS bearing includes one of the followings: Single Cell Point-to-Multipoint (SC-PTM), and Multimedia broadcast Single Frequency Network (MBSFN).

In an alternative implementation of the present embodiment, the step S202 of the embodiment, in which the V2X AS classifies and identifies the V2X service, may be implemented in the steps described below.

In step S202-1, the V2X AS classifies the V2X service according to a type or a priority of the V2X service.

In step S202-2, the V2X AS identifies the classified V2X, where the identifier is a TMGI allocated by the BM-SC.

It can be seen from the steps S202-1 and S202-2 described above, the V2X AS classifies the V2X service, such as, a periodic type of V2X services, an event-triggered type of V2X services. In one or more embodiments, the V2X AS classifies the V2X service according to the priority of the V2X service, for example classifying according to a priority identifier, i.e., QoS Class Identifier (QCI). It is noted that the V2X AS classifies V2X services, which may be V2X services received by the V2X AS from several OBUs, or may be the types of V2X services known by the V2X AS already.

In an alternative implementation of the present embodiment, the step S206 of the embodiment, in which the V2X AS sends the V2X service through the MBMS bearing established by the BM-SC, may be implemented in the steps described below.

In step S206-1, the V2X AS sends announcement information of the V2X service to an OBU, where the announcement information includes at least one of the followings: the service identifier, TMGI, of the V2X service, a starting time for sending the V2X service, a target area to which the V2X service is sent, a carrier frequency on which the V2X service is sent.

In step S206-2, the V2X AS sends the V2X service to the target area of the V2X service determined by the V2X AS through the MBMS bearing.

It can be seen from the steps S206-1 and S206-2, the V2X AS sends the announcement of the V2X service to notify of information about the V2X service, such as the TMGI corresponding to the V2X service, the starting time of the V2X service, a service area, the carrier frequency on which the V2X service is sent. The V2X AS may send the announcement of the V2X service through an application layer or through a short message, and the OBU receives the announcement of the V2X service.

Figure 3:
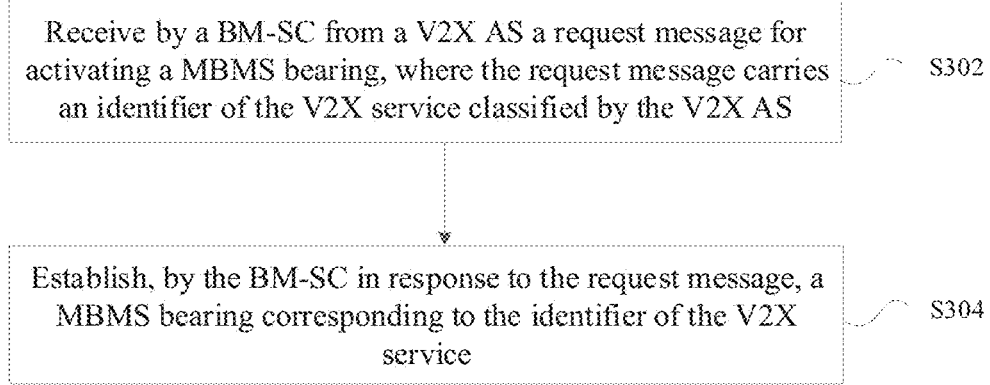
FIG. 3 is a flow chart of a method for sending a V2X service applied to a BM-SC according to an embodiment of the present disclosure.

FIG. 3 is a flow chart of a method for sending a V2X service applied to a BM-SC according to an embodiment of the present disclosure. As shown in FIG. 3, the method includes the steps described below.

In step S302, a BM-SC receives from a V2X AS a request message for activating a MBMS bearing, where the request message carries an identifier of the V2X service classified by the V2X AS.

In step S304, the BM-SC, in response to the request message, establishes the MBMS bearing corresponding to the identifier of the V2X service.

In the steps S302 and S304, the BM-SC establishes the MBMS bearing according to the received request message and initiates a process of MBMS session start. The BM-SC needs to establish a respective MBMS bearing for each TMGI. In other words, the respective MBMS bearing is established for each type of the V2X service. Namely, each TMGI corresponds to one type of V2X service and further corresponds to one MBMS bearer.

When the BM-SC establishes a MBMS bearing for a certain type of V2X service, the OBU may have not sent data content of this type of V2X service to the network side. For example, the AS has not received a data packet of the type of V2X service sent from any OBU. This method is also by: pre-establishing the respective MBMS bearing corresponding to the certain type of V2X service. In this case, the pre-established bearing includes a control plane bearing, as well as a user plane bearing from the BM-SC to an RSU, i.e., all the bearings, except for a user plane bearing of an air interface, have been pre-established.

In addition, in another alternative implementation of the present embodiment, the method of the embodiment further includes: the BM-SC receives information of a target area of the V2X service determined by the V2X AS, and the BM-SC distinguishes MBMS bearings according to different target areas of the V2X service. In other words, in a scenario where target OBUs are located in different service areas, the BM-SC establishes different MBMS bearings even for the same V2X service (i.e., the same TMGI). Different MBMS bearings established by the BM-SC are distinguished according to different flow IDs.

With the implementations described above, those skilled in the art can clearly recognize that the method according to the above embodiments may be implemented in software in combination with a necessary universal hardware platform, or of course may be implemented in hardware. In most cases, the former is the preferred implementation. With this understanding, the present application may be embodied in the form of a software product. The computer software product is stored in a storage medium (e.g., ROM/RAM, disc, CD-ROM) and includes instructions enabling a terminal device (which may be a mobile phone, computer, server or network device, etc.) to implement the method according to various embodiments of the present application.

An embodiment further provides an apparatus for sending a V2X service. The apparatus is configured to implement embodiments and alternative implementations described above. Those already been described will not be described here. The term "module" which will be used hereafter can be a combination of software and/or hardware for achieving a predetermined function. While the apparatus described in the embodiment below is preferably implemented in software, but implementations in hardware or a combination of software and hardware are also possible and contemplated.

Figure 4:
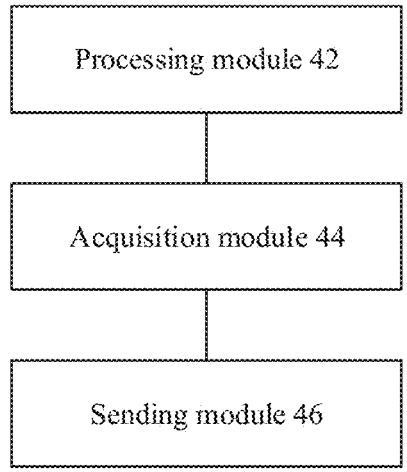
FIG. 4 is a structure block diagram of an apparatus for sending a V2X service applied to a V2X AS according to an embodiment of the present disclosure.

FIG. 4 is a structure block diagram of an apparatus for sending a V2X service applied to a V2X AS according to an embodiment of the present disclosure. As shown in FIG. 4, the apparatus includes a processing module 42, an acquisition module 44 and a sending module 46. The processing module 42 is configured to classify and identify a V2X service, where different types of V2X services have different identifiers. The acquisition module 44 is coupled to the processing module 42 and is configured to send a request message to a BM-SC, where the request message is used for instructing the BM-SC to establish a MBMS bearing corresponding to an identifier of the V2X service. The sending module 46 is coupled to the acquisition module 44 and is configured to send the V2X service through the MBMS bearing established by the BM-SC.

In one or more embodiments, the BM-SC establishes the MBMS bearing for the V2X service as follows: the BM-SC establishes the MBMS bearing corresponding to a type of the V2X service acquired in advance. The MBMS bearing includes one of the followings: SC-PTM, and MBSFN.

In one or more embodiments, the processing module 42 includes a processing unit and an identifying unit. The processing unit is configured to classify the V2X service according to a type or a priority of the V2X service. The identifying unit is coupled to the processing unit and is configured to identify the classified V2X service, where the identifier is a TMGI allocated by the BM-SC.

In one or more embodiments, the request message carries at least one of the followings: QoS of the V2X service, a broadcast area for indicating a target area of the V2X service, a starting time for sending the V2X service.

In one or more embodiments, the sending module 46 includes a second sending unit and a third sending unit. The second sending unit is configured to send announcement information of the V2X service to an OBU, where the announcement information includes at least one of the followings: the identifier service, TMGI, of the V2X service, a starting time for sending the V2X service, a target area to which the V2X service is sent, a carrier frequency on which the V2X service is sent. The third sending unit is coupled to the second sending unit and is configured to send the V2X service to the target area of the V2X service determined by the V2X AS through the MBMS bearing.

Figure 5:
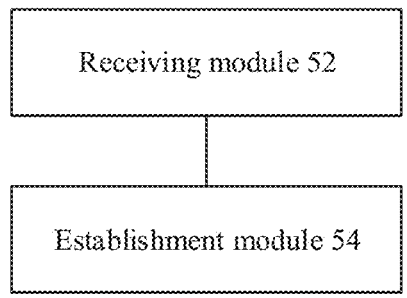
FIG. 5 is a structure block diagram of an apparatus for sending a V2X service applied to a BM-SC according to an embodiment of the present disclosure.

FIG. 5 is a structure block diagram of an apparatus for sending a V2X service applied to a BM-SC according to an embodiment of the present disclosure. As shown in FIG. 5, the apparatus includes a receiving module 52 and an establishment module 54. The receiving module 52 is configured to receive from a V2X AS a request message for activating a MBMS bearing, where the request message carries an identifier of the V2X service classified by the V2X AS. The establishment module 54 is coupled to the receiving module 52 and is configured to, in response to the request message, establish the MBMS bearing corresponding to the identifier of the V2X service.

In one or more embodiments, the apparatus further includes a receiving module and a distinguishing module. The receiving module is configured to receive information of a target area of the V2X service determined by the V2X AS. The distinguishing module is configured to distinguish the MBMS bearing according to the target area of the V2X service.

Figure 6:
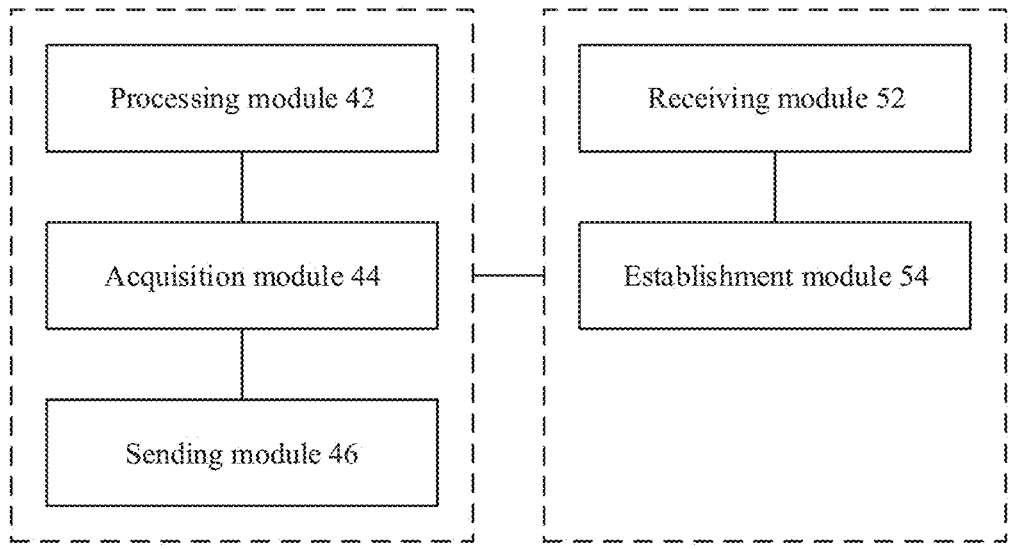
FIG. 6 is a structure block diagram of a system for sending a V2X service according to an embodiment of the present disclosure.

FIG. 6 is a structure block diagram of a system for sending a V2X service according to an embodiment of the present disclosure. As shown in FIG. 6, the system includes the apparatus in the embodiment of FIG. 4 and the apparatus in the embodiment of FIG. 5.

The present application will be illustrated in combination with alternative embodiments thereof.

The alternative embodiment provides a method of sending a V2X service. The method includes the following steps. The V2X AS classifies received V2X services according to types of the V2X services, and configures corresponding TMGIs to the different types of the V2X services through the BM-SC. The V2X AS determines a sending area of each V2X service and notifies RSU(s) and/or eNB(s). The RSU and/or eNB sends the V2X service(s) in the manner of PTM in the corresponding area. The OBU acquires a mapping relation between the TMGIs and the V2X services from a service announcement and receives the required V2X service(s) according to the TMGI(s).

Figure 7:
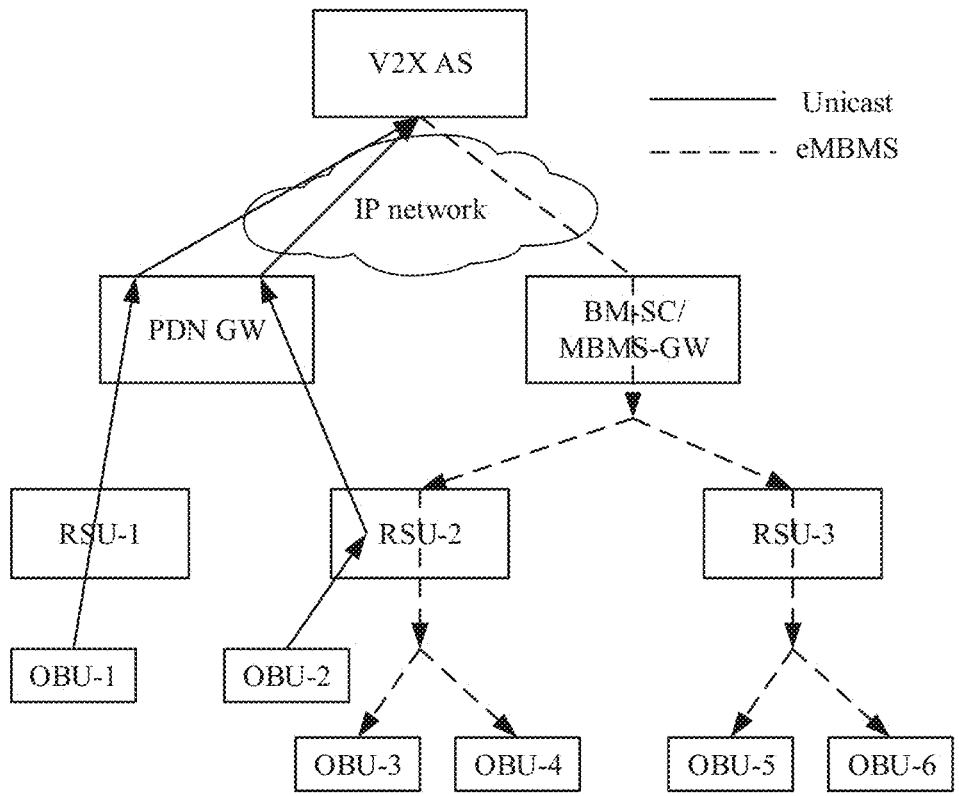
FIG. 7 is a schematic diagram of issuing a V2X service from a V2X AS to receiving OBUs by PTM according to an alternative embodiment of the present application.

The alternative embodiment is described below in combination with a specific application scenario. FIG. 7 is a schematic diagram of issuing a V2X service from a V2X AS to receiving OBUs according to an alternative embodiment of the present application. The method of the alternative embodiment is described with reference to FIG. 7. In view of this, the method includes the steps described below.

In step S702, an OBU sends a V2X service to a V2X AS (i.e., V2X application server, which is called as AS for short in this alternative embodiment).

The OBU establishes a unicast bearing and sends the V2X service to the AS through the unicast bearing. There are one or more OBUs. In the alternative embodiment, the V2X service includes at least one of the followings: V2V, V2I, V2P, or Vehicle-to-Network (V2N). In addition, in the embodiment, the OBU includes at least one of the followings: LTE UE, or DSRC OBU.

In step S704, the V2X AS processes according to the type of the V2X service.

The AS classifies the V2X services, e.g., periodic V2X, event-triggered V2X, etc. Or, the AS classifies the V2X services according to the priority of the V2X service, e.g., according to priority identifier, i.e., QoS Class Identifier, QCI.

The AS classifies the V2X services. These V2X services may be V2X services received by the AS from several OBUs, or may be of types of V2X services known by the AS (these V2X service may have not been sent from the OBUs to the AS, and the AS classifies the V2X services according to information stored in the AS).

The V2X AS may request TMGIs from the BM-SC according to classification of the received V2X services. The different types of the V2X services correspond to different TMGIs. In one or more embodiments, in the following step S706, the BM-SC allocates the TMGI to the V2X service when the BM-SC receives a request for activating a MBMS bearing from the AS. The BM-SC sends the allocated TMGI and the valid time of the TMGI to the AS. The valid time of the TMGI refers to a period in which the TMGI and the corresponding MBMS bearing are valid. When the valid time expires, the TMGI becomes invalid and the corresponding MBMS bearing is released.

In step S706, the V2X AS activates the MBMS bearing through the BM-SC.

The AS sends a request message for activating the MBMS bearing to the BM-SC. The request message includes at least one of the followings: TMGI, QoS, a broadcast area or a starting time.

The TMGI is used for indicating the V2X service. If the request message does not include the TMGI, the BM-SC indicates the TMGI in a response message. The QoS is used for indicating a requirement on QoS for the V2X service. The broadcast area is used for indicating a target area of the V2X service, which may be represented by a Cell identifier (ID). The starting time is used for indicating a starting time for sending the V2X service.

The BM-SC establishes the MBMS bearing according to the received request message and initiates a process of an MBMS session start.

The BM-SC needs to establish a respective MBMS bearing for each TMGI. In other words, a respective MBMS bearing needs to be established for each type of V2X service. Namely, each TMGI corresponds to one type of V2X service and the one type of V2X service further corresponds to a respective MBMS bearing.

When the BM-SC establishes a MBMS bearing for a certain type of V2X service, the OBU may have not sent data content of this type of V2X service to the network side. For example, the AS has not received a data packet of the type of V2X service sent from any OBU. The above method may also be: pre-establishing the respective MBMS bearing corresponding to the certain type of V2X service. In this case, the pre-established bearing includes a control plane bearing, as well as a user plane bearing from the BM-SC to an RSU. In other words, all the bearings, except for a user plane bearing of an air interface, have been pre-established.

In a scenario where target OBUs are located at different service areas, the BM-SC establishes different MBMS bearings even for the same type of V2X services (i.e., for the same TMGI). Different MBMS bearings are distinguished according to different flow IDs.

The BM-SC sends a response message to the AS. The response message includes at least one of the followings: a TMGI, a flow ID, a valid time, a service description, an IP address and a port of the BM-SC. The flow ID is used for distinguishing the V2X services which have the same TMGI and are in different service areas. The service description is used for indicating the attribute of the V2X service (e.g., a service area, a carrier frequency for sending). The IP address and the port of the BM-SC is used for indicating an address of the BM-SC on the user plane. The MBMS bearing includes at least one of the followings: SC-PTM, or MBSFN.

In step S708, the AS sends the V2X service on the MBMS bearing through the BM-SC.

The AS sends an announcement of the V2X service to notify of information about the V2X service, such as the mapping relation between the V2X service and the TMGI, the starting time for sending the V2X service, the service area, the carrier sending frequency. The AS may send the announcement of the V2X service through an application layer or through a short message. Then, the OBU receives the announcement of the V2X service.

The AS sends, to the RSU and/or the eNB within the service area, the V2X service on the established MBMS bearing through the BM-SC.

In step S710, the RSU and/or the eNB sends the V2X service in the target area.

The RSU and/or the eNB determines the target area according to area information in the MBMS session start. The RSU and/or the eNB schedules and sends the V2X service in the target area in a manner of MBMS broadcast. The MBMS broadcast includes at least one of the followings: MBSFN, and SC-PTM.

The RSU of the alternative embodiment includes at least one of the followings: eNB-typed RSU, stationary UE-typed RSU, or DSRC-typed RSU.

In step S712, the target OBU detects and receives the required V2X service, and the target OBU receives the required V2X service according to the TMGI.

On the basis of the method of the embodiment in the scenario described above, the alternative embodiment of the present application will be described in detail below in combination to specific embodiments.

Embodiment 1

Figure 8:
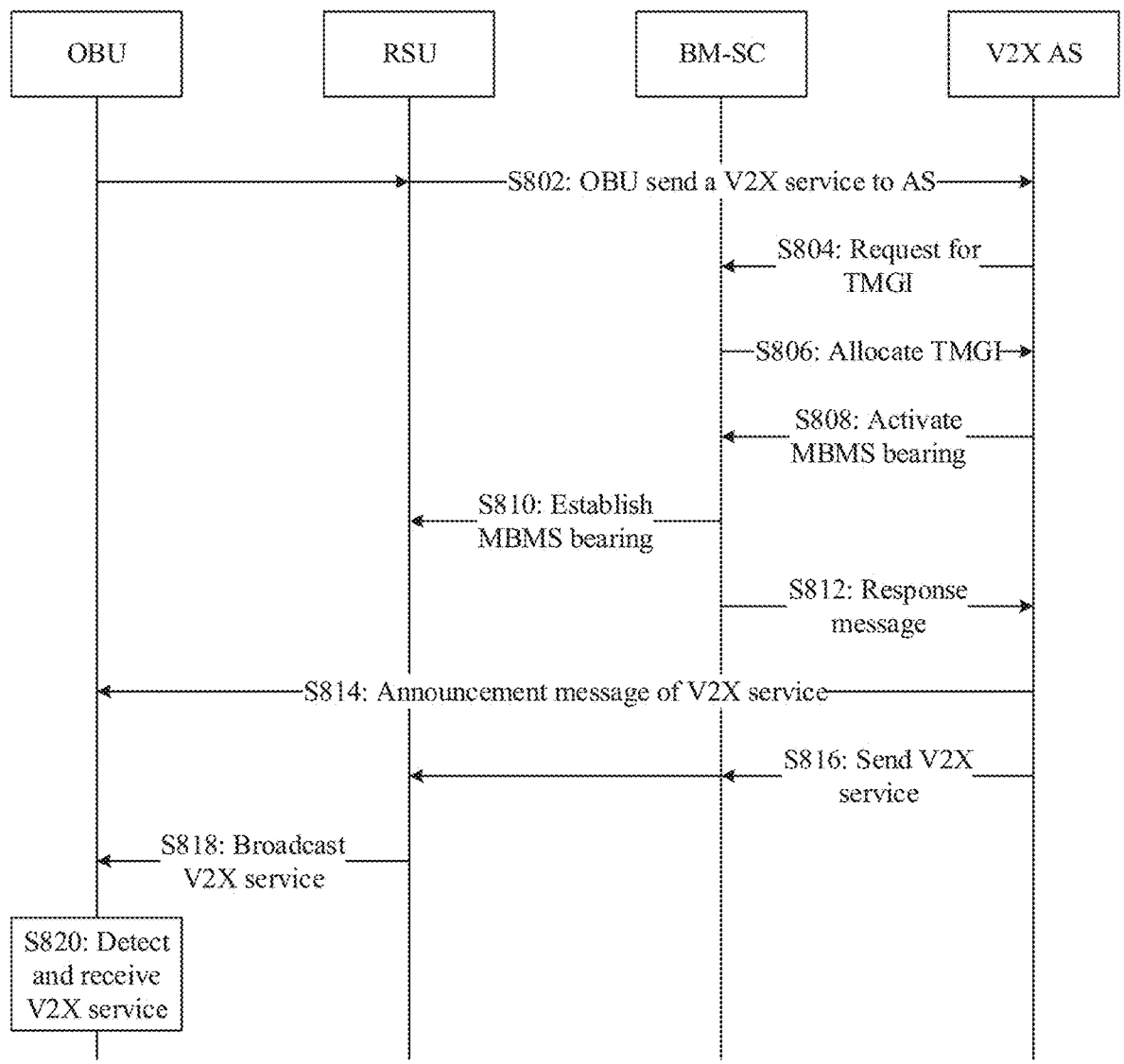
FIG. 8 is a flow chart of a method for an AS requesting a BM-SC to allocate a TMGI according to an alternative embodiment of the present application.

FIG. 8 is a flow chart of a method of an AS requesting a BM-SC to allocate a TMGI according to an alternative embodiment of the present application. As shown in FIG. 8, the method includes the steps described below.

In step S802, an OBU sends a V2X service to a V2X AS.

The OBU sends the V2X service to the V2X AS through a unicast bearer.

In step S804, the AS requests a BM-SC to allocate a TMGI.

The AS requests the TMGI from the BM-SC according to the type of the received V2X service. The different types of V2X services correspond to different TMGIs. In one or more embodiments, when the AS finds that a valid time of a previously acquired TMGI is about to expire, the AS sends the BM-SC a request for extending the valid time of the TMGI.

In step S806, the BM-SC allocates the TMGI and notifies the AS.

The BM-SC allocates the TMGI and the valid time of the TMGI, and notifies the AS.

In step S808, the AS sends a request for activating a MBMS bearing to the BM-SC.

In step S810, the BM-SC establishes the MBMS bearing.

The BM-SC establishes the MBMS bearing through a process of MBMS session start.

In step S812, the BM-SC sends a response message to the AS.

The response message includes at least one of the followings: a V2X service description, or an IP address/a port of the BM-SC.

In step S814, the AS sends an announcement message of the V2X service.

The AS sends the announcement of the V2X service through an application layer or a Short Message Service (SMS), etc.

In step S816, the AS sends the V2X service through the BM-SC.

The AS sends the V2X service through the MBMS bearing established by the BM-SC.

In step S818, an RSU broadcasts the V2X service in a target area.

The RSU determines the target area according to an instruction from an MBMS Coordination Entity (MCE) and broadcasts the V2X service in the target area.

In step S820, the OBU detects and receives the required V2X service. The process is end.

The OBU is an OBU in the target area and is in a Radio Resource Control (RRC)-idle state or an RRC-connected state.

Embodiment 2

Figure 9:
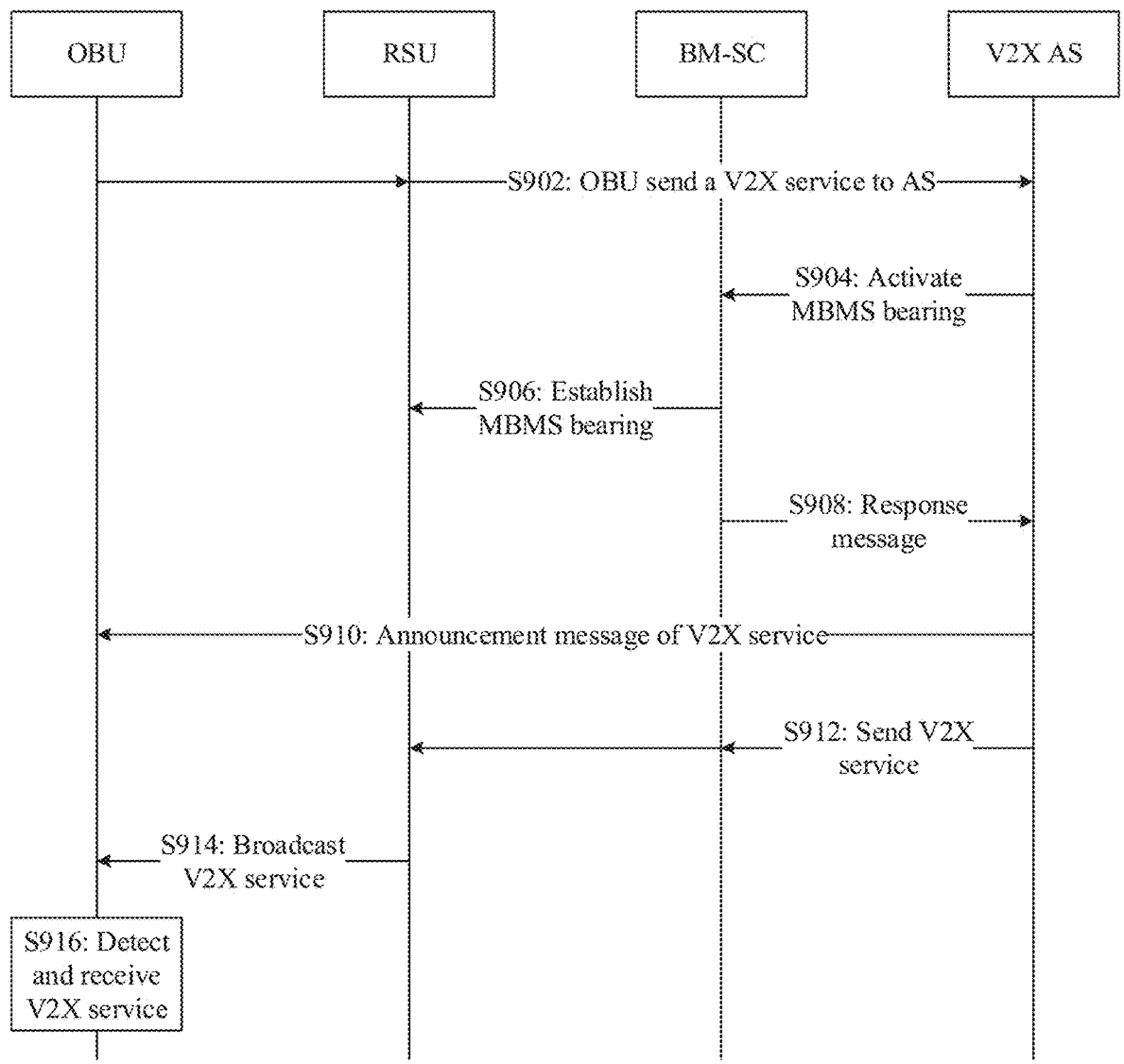
FIG. 9 is a flow chart of a method for allocating a TMGI automatically by a BM-SC according to an alternative embodiment of the present application.

FIG. 9 is a flow chart of a method of allocating a TMGI automatically by a BM-SC according to an alternative embodiment of the present application. As shown in FIG. 9, the method includes the steps described below.

In step S902, an OBU sends a V2X service to a V2X AS.

In step S904, the V2X AS sends a request message for activating a MBMS bearing to a BM-SC.

In step S906, the BM-SC establishes the MBMS bearing.

In step S908, the BM-SC sends a response message to the AS.

The response message includes at least one of the followings: a TMGI, a flow ID, a valid time, a service description, or an IP address and a port of the BM-SC.

In step S910, the AS sends an announcement of the V2X service.

In step S912, the AS sends the V2X service through the BM-SC.

In step S914, an RSU broadcasts the V2X service in a target area.

In step S916, the OBU detects and receives the required V2X service.

The process is end.

Embodiment 3

Figure 10:
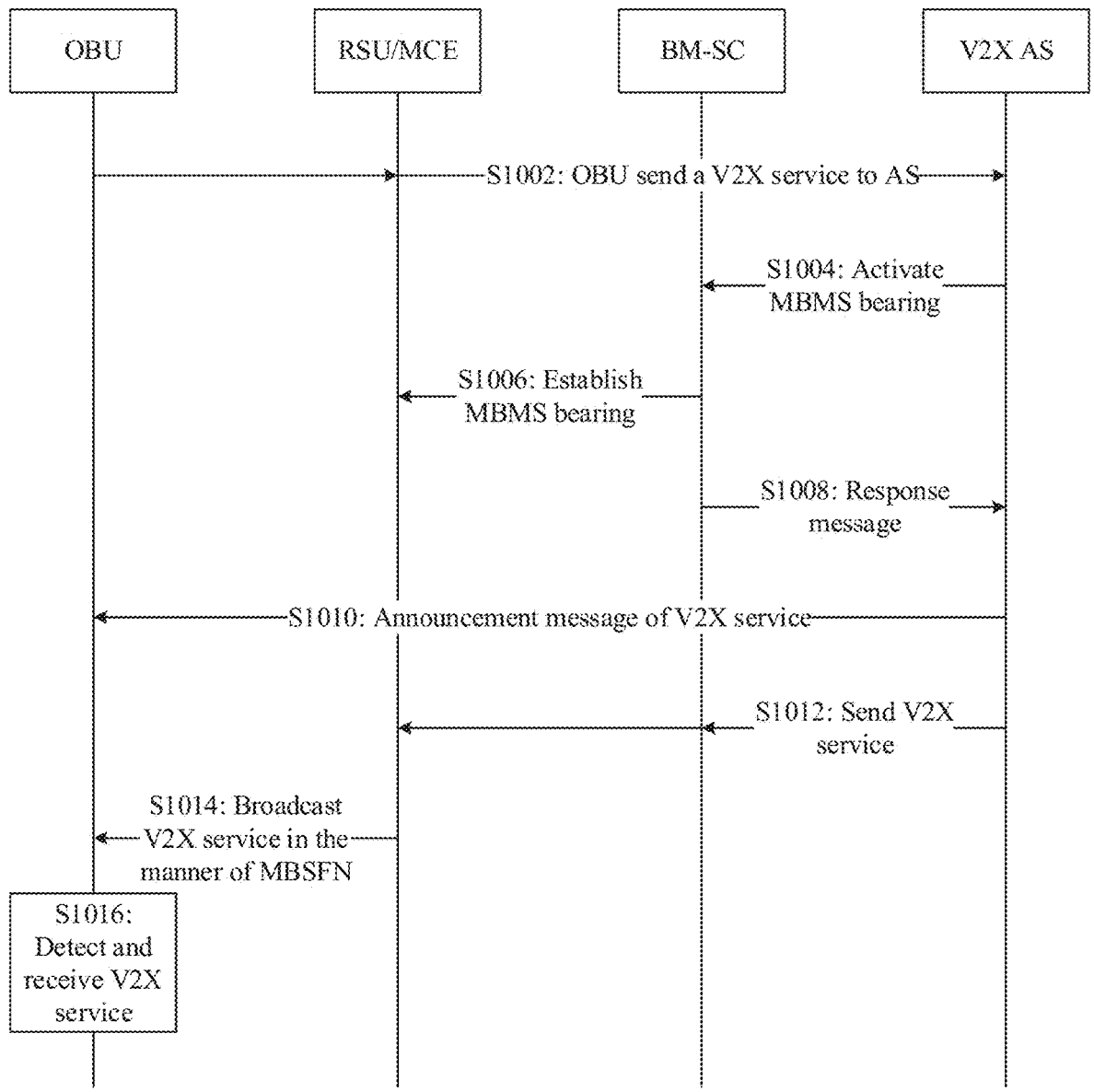
FIG. 10 is a flow chart of a method for sending a V2X service in a manner of MBSFN according to an alternative embodiment of the present application.

FIG. 10 is a flow chart of a method of sending a V2X service in a manner of MBSFN according to an alternative embodiment of the present application. As shown in FIG. 10, the method includes the steps described below.

In step S1002, an OBU sends a V2X service to a V2X AS.

In step S1004, the V2X AS sends a request message for activating a MBMS bearing to a BM-SC.

In step S1006, the BM-SC establishes the MBMS bearing.

In step S1008, the BM-SC sends a response message to the AS.

In step S1010, the AS sends an announcement of the V2X service.

In step S1012, the AS sends the V2X service through the BM-SC.

In step S1014, an MCE determines that the V2X service is sent in the manner of MBSFN.

The MCE determines to use the MBSFN manner according to at least one of the following conditions: a service area in an MBMS session start message, a strategy of an operator, or an instruction information from the AS or the BM-SC.

In step S1016, a target OBU detects and receives the required V2X service.

Embodiment 4

Figure 11:
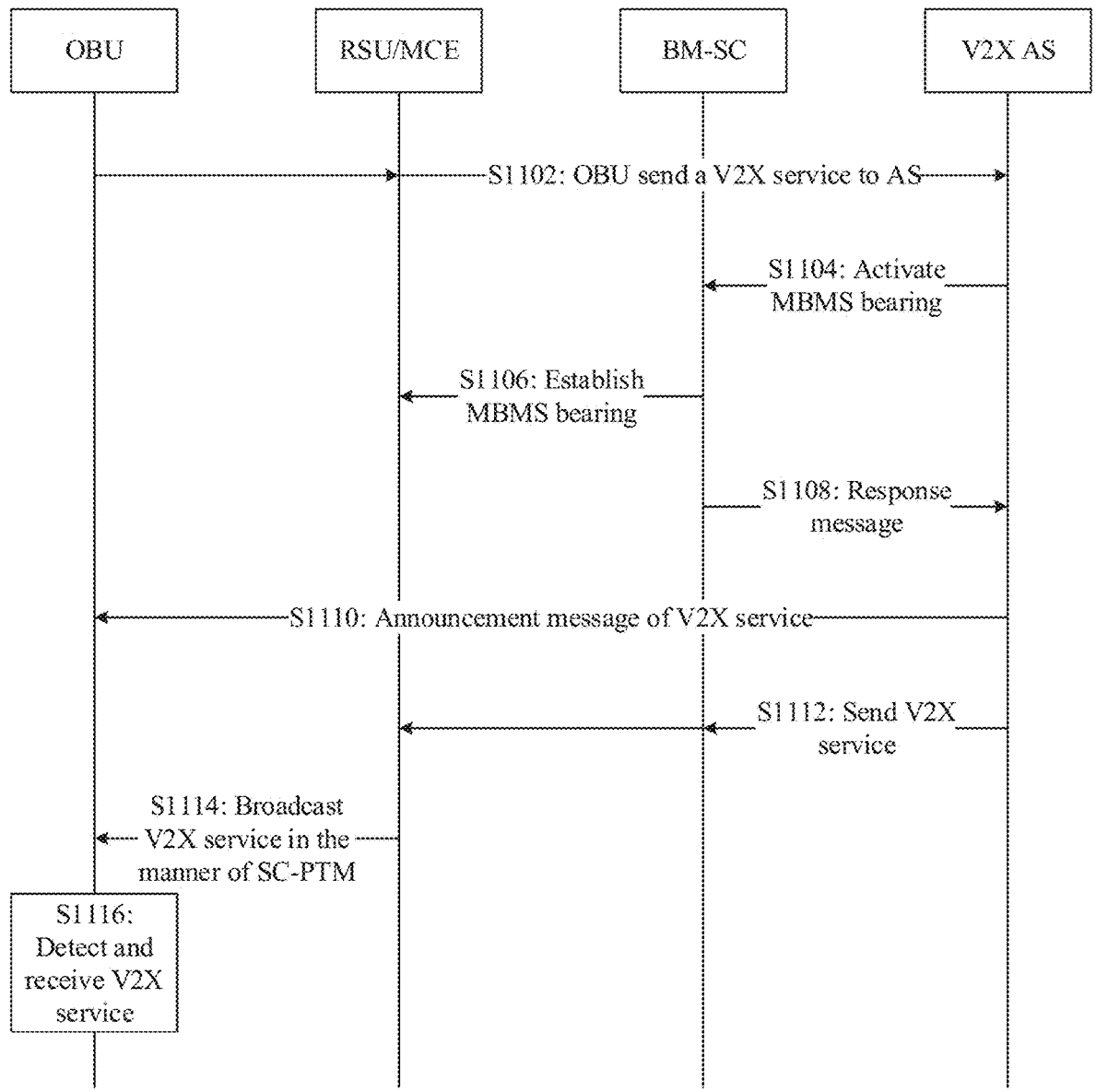
FIG. 11 is a flow chart of a method for sending a V2X service in a manner of SC-PTM according to an alternative embodiment of the present application.

FIG. 11 is a flow chart of a method of sending a V2X service in a manner of SC-PTM according to an alternative embodiment of the present application. As shown in FIG. 11, the method includes the steps described below.

In step S1102, an OBU sends a V2X service to a V2X AS.

In step S1104, the V2X AS sends a request message for activating a MBMS bearing to a BM-SC.

In step S1106, the BM-SC establishes the MBMS bearing.

In step S1108, the BM-SC sends a response message to the AS.

In step S1110, the AS sends an announcement of the V2X service.

In step S1112, the AS sends the V2X service through the BM-SC.

In step S1114, an MCE determines that the V2X service is sent in the manner of SC-PTM.

The MCE determines to use the SC-PTM manner according to at least one of the following conditions: a service area in an MBMS session start message, a strategy of an operator, or an instruction information from the AS or the BM-SC.

In step S1116, a target OBU detects and receives the required V2X service.

Figure 12:
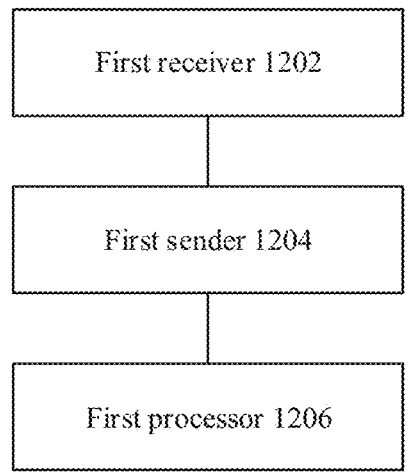
FIG. 12 is a structure block diagram 1 of an apparatus for sending a V2X service according to an alternative embodiment of the present application.

FIG. 12 is a structure block diagram 1 of an apparatus for sending a V2X service according to an alternative embodiment of the present application. As shown in FIG. 12, the apparatus includes a first receiver 1202, a first sender 1204 and a first processor 1206. The first receiver 1202 is configured to receive a request message for activating a MBMS bearing, a TMGI request message and data of a V2X service. The first sender 1204 is configured to send the data of the V2X service and MBMS through the MBMS bearing, and further configured to send a response message to a V2X AS. The first processor 1206 is configured to allocate the TMGI and the valid time, and further configured to establish the MBMS bearing. The apparatus is a BM-SC.

Figure 13:
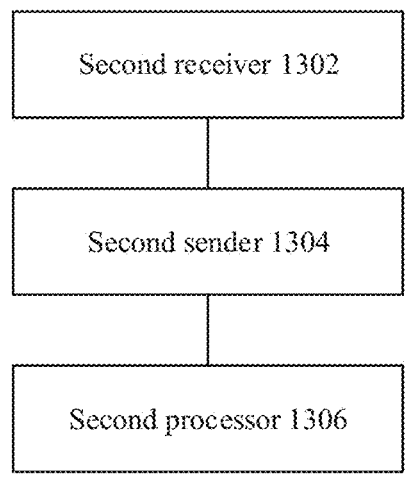
FIG. 13 is a structure block diagram 2 of an apparatus for sending V2X service according to an alternative embodiment of the present application.

FIG. 13 is a structure block diagram 2 of an apparatus for sending a V2X service according to an alternative embodiment of the present application. As shown in FIG. 13, the apparatus includes a second receiver 1302, a second sender 1304 and a second processor 1306. The second receiver 1302 is configured to receive an announcement message of the V2X service and the data of the V2X service. The second sender 1304 is configured to send the data of the V2X service to the V2X AS. The second processor 1306 is configured to determine a manner in which the V2X service is received and detect the V2X service. The apparatus is an LTE OBU or a DSRC OBU or an LTE UE.

It can be seen from the alternative embodiment that the LTE V2X service can be sent through the MBMS bearing, which broadens the range of sending the V2X service and enhances the flexibility in sending the LTE V2X service.

An embodiment of the present disclosure further provides a computer readable storage medium. Alternatively, in the embodiment, the above computer readable storage medium may be configured to store the program codes for implementing the steps described below.

In step S1, a V2X AS classifies and identifies a V2X service, where different types of V2X services have different identifiers.

In step S2, the V2X AS sends a request message to a BM-SC, where the request message is used for instructing the BM-SC to establish a MBMS bearing corresponding to the identifier of the V2X service.

In step S3, the V2X AS sends the V2X service through the MBMS bearing established by the BM-SC.

Alternatively, in the embodiment, the above computer readable storage medium may be configured to store the program codes for implementing the steps described below.

In step S4, a BM-SC receives from a V2X AS a request message for activating a MBMS bearing, where the request message carries an identifier of the V2X service classified by the V2X AS.

In step S5, the BM-SC, in response to the request message, establishes the MBMS bearing corresponding to the identifier of the V2X service.

In one or more embodiments, in the embodiment, the above computer readable storage medium may include, but not limited to, various medium for storing program codes such as USB flash disk, ROM (Read-Only Memory), RAM (Random Access Memory), mobile hard disk, disc or CD-ROM, etc.

In one or more embodiments, in the embodiment, a processor implements the steps S1 to S3 based on the program codes stored in the computer readable storage medium.

In one or more embodiments, in the embodiment, a processor implements the steps S4 and S5 based on the program codes stored in the computer readable storage medium.

In one or more embodiments, the specific examples of the embodiment may reference the examples in the embodiments and alternative implementations described above, and will not be repeated here.

Those skilled in the art shall understand that modules or steps of the present application described above may be implemented by means of universal computing devices, which may be integrated in a single computing device or distributed among a network consisting of multiple computing devices. In one or more embodiments, the modules or steps may be implemented by program codes which are executable by a computing device; hence, the program codes may be stored in a storage device and executed by a computing device. In some cases, the illustrated or described steps may be performed in an order different from that described herein; the modules or steps may be embodied by respective integrated circuit modules, or some of them may be embodied by a single integrated circuit module. Therefore, the present application is not limited to any specific combination of hardware and software.

The above description is merely alternative embodiments of the present application and not to limit the present application. For those skilled in the art, the present application may have various modifications and alternatives. All of the modifications, equivalents and improvements within the scope and principle of the present application are intended to fall within the scope of the present application.

INDUSTRIAL APPLICABILITY

Embodiments of the present application provide a method and apparatus for sending a V2X service, so as to address the problem that it is difficult for the V2X AS to forward different types of V2X services in the related art.

What is claimed is:

1. A method for sending a V2X service, comprising:
classifying, by a Vehicle to Everything (V2X) Application Server (AS), the V2X service according to a type of the V2X service, and identifying, by the V2X AS, the classified V2X service, wherein different types of V2X services include different identifiers, the different types of V2X services comprises a periodic type of V2X services and an event-triggered type of V2X services;
sending, by the V2X AS, a request message to a Broadcast Multicast Service Center (BM-SC), wherein the request message is used for instructing the BM-SC to establish a Multimedia Broadcast Multicast Service (MBMS) bearing corresponding to an identifier of the V2X service; and sending, by the V2X AS, the V2X service through the MBMS bearing established by the BM-SC, wherein sending, by the V2X AS, the V2X service through the MBMS bearing established by the BM-SC comprises:

sending, by the V2X AS, announcement information of the V2X service to an On-Board Unit (OBU), wherein the announcement information comprises a starting time for sending the V2X service and a carrier frequency on which the V2X service is sent; and sending, by the V2X AS, the V2X service through the MBMS bearing to the target area of the V2X service determined by the V2X AS; and wherein the method is performed by at least one processor.

2. The method according to claim 1, wherein the MBMS bearing comprises at least one of: Single Cell Point-to-Multipoint (SC-PTM), or Multimedia broadcast Single Frequency Network (MBSFN).

3. The method according to claim 1, wherein the identifier of the classified V2X service includes a Temporary Mobile Group Identity (TMGI) allocated by the BM-SC.

4. The method according to claim 1, wherein the request message carries at least one of: Quality of Service (QoS) of the V2X service, a broadcast area for indicating a target area of the V2X service, or a starting time for sending the V2X service.

5. A non-transitory computer readable storage medium storing computer-executable instructions for executing the method of claim 1.

6. An apparatus for sending a V2X service, comprising:
a processor; and
a memory for storing instructions executable by the processor,
wherein the processor is configured to perform a method for sending the V2X service, the method comprising:

classifying, by a Vehicle to Everything (V2X) Application Server (AS), the V2X service according to a type of the V2X service, and identifying, by the V2X AS, the classified V2X service, wherein different types of V2X services include different identifiers, the different types of V2X services comprises a periodic type of V2X services and an event-triggered type of V2X services;

sending, by the V2X AS, a request message to a Broadcast Multicast Service Center (BM-SC), wherein the request message is used for instructing the BM-SC to establish a Multimedia Broadcast Multicast Service (MBMS) bearing corresponding to an identifier of the V2X service; and sending, by the V2X AS, the V2X service through the MBMS bearing established by the BM-SC, wherein sending, by the V2X AS, the V2X service through the MBMS bearing established by the BM-SC comprises:

sending, by the V2X AS, announcement information of the V2X service to an On-Board Unit (OBU), wherein the announcement information comprises a starting time for sending the V2X service and a carrier frequency on which the V2X service is sent; and sending, by the V2X AS, the V2X service through the MBMS bearing to the target area of the V2X service determined by the V2X AS.

7. The apparatus according to claim 6, wherein the MBMS bearing comprises at least one of: Single Cell Point-to-Multipoint (SC-PTM), or Multimedia broadcast Single Frequency Network (MBSFN).

8. The apparatus according to claim 6, wherein the identifier of the classified V2X service includes a Temporary Mobile Group Identity (TMGI) allocated by the BM-SC.

9. The apparatus according to claim 6, wherein the request message carries at least one of: Quality of Service (QoS) of the V2X service, a broadcast area for indicating a target area of the V2X service, or a starting time for sending the V2X service.

* * * * *